(12) United States Patent
Shimizu

(10) Patent No.: US 7,505,681 B2
(45) Date of Patent: Mar. 17, 2009

(54) CAMERA AND CONTROL METHOD THEREFOR

(75) Inventor: Masami Shimizu, Nakano-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 449 days.

(21) Appl. No.: 11/388,684

(22) Filed: Mar. 23, 2006

(65) Prior Publication Data
US 2006/0216015 A1    Sep. 28, 2006

(30) Foreign Application Priority Data
Mar. 25, 2005    (JP)    ............................. 2005-088935

(51) Int. Cl.
*G03B 15/03* (2006.01)
(52) U.S. Cl. ..................... 396/157; 396/173
(58) Field of Classification Search ................. 396/157, 396/173
See application file for complete search history.

(56) References Cited

U.S. PATENT DOCUMENTS

| | | | |
|---|---|---|---|
| 4,291,979 A * | 9/1981 | Yuasa et al. .................. 356/218 |
| 4,460,263 A * | 7/1984 | Gfeller et al. ................. 396/157 |
| 4,484,807 A * | 11/1984 | Kataoka et al. .............. 396/157 |
| 4,549,801 A * | 10/1985 | Winter ......................... 396/106 |
| 4,643,551 A * | 2/1987 | Ohmori ....................... 396/157 |
| 4,655,576 A * | 4/1987 | Yuasa et al. .................. 396/157 |
| 5,051,768 A * | 9/1991 | Harrison ...................... 396/157 |
| 5,168,300 A * | 12/1992 | Yasukawa .................... 396/157 |
| 5,491,533 A * | 2/1996 | Sakamoto .................... 396/173 |
| 5,526,092 A * | 6/1996 | Iwasaki ........................ 396/234 |
| 6,349,175 B1 * | 2/2002 | Tokunaga .................... 396/157 |
| 6,801,716 B2 * | 10/2004 | Takeuchi ....................... 396/61 |
| 2003/0063907 A1 * | 4/2003 | Muramatsu .................. 396/157 |
| 2005/0213957 A1 * | 9/2005 | Tokunaga ...................... 396/61 |

FOREIGN PATENT DOCUMENTS

| | | |
|---|---|---|
| JP | 9-61883 | 3/1997 |
| JP | 9-61913 | 3/1997 |
| JP | 10-32750 | 2/1998 |

\* cited by examiner

*Primary Examiner*—Melissa Jan Koval
*Assistant Examiner*—Michael A Strieb

(57) ABSTRACT

In a circumstance in which light is emitted from many electronic flashes, e.g., a press conference hall or a wedding hall, light emission from other electronic flashes overlaps preliminary light emission performed before main light emission. This decreases the photometry accuracy with respect to preliminary light emission and makes it difficult to perform proper flash exposure. In a camera system designed to perform preliminary light emission before main light emission, photometry is performed a plurality of number of times upon preliminary light emission, and flash exposure is performed by suppressing photometric values which may have been influenced by light emission as disturbance other than the preliminary light emission.

10 Claims, 15 Drawing Sheets

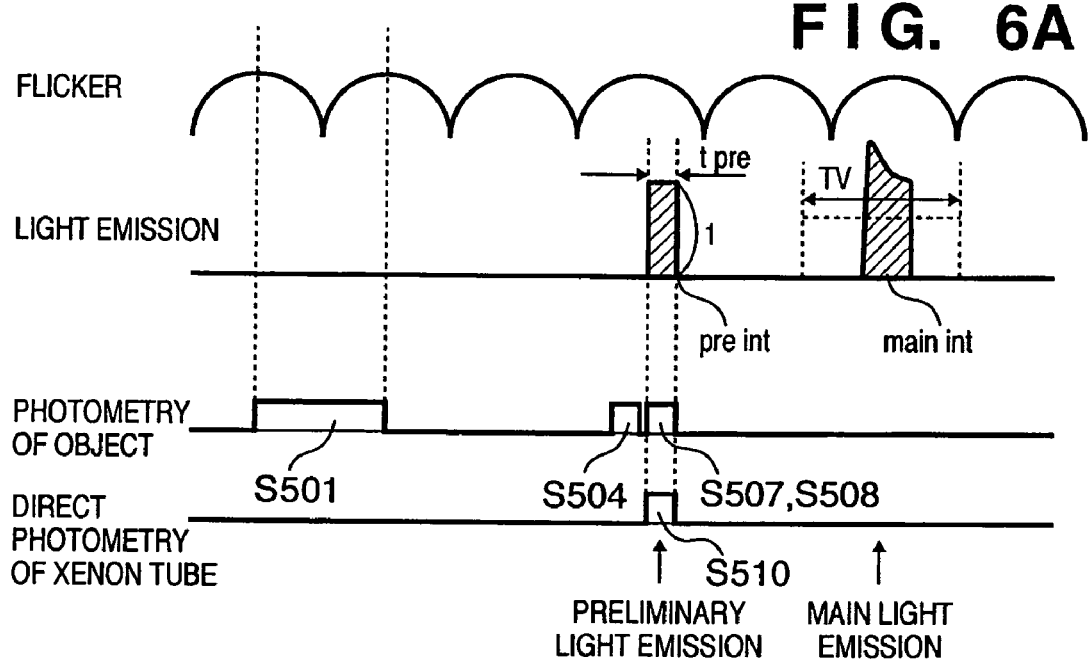
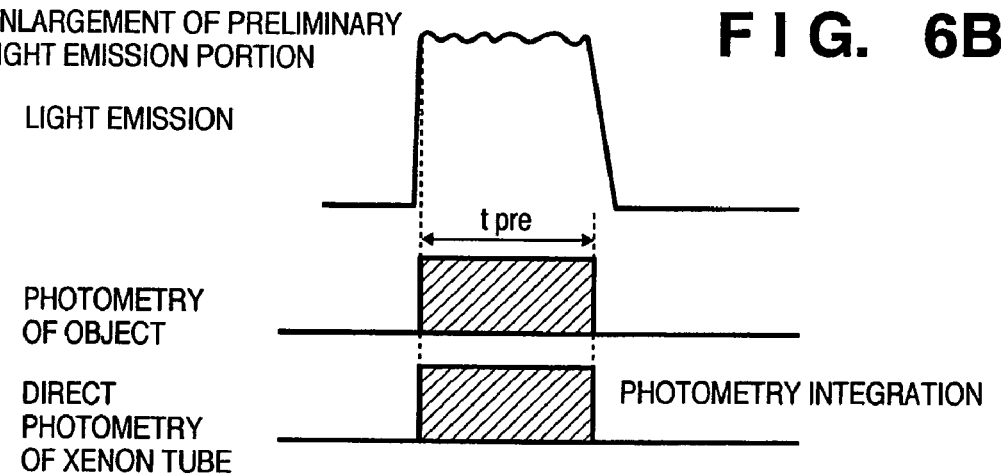
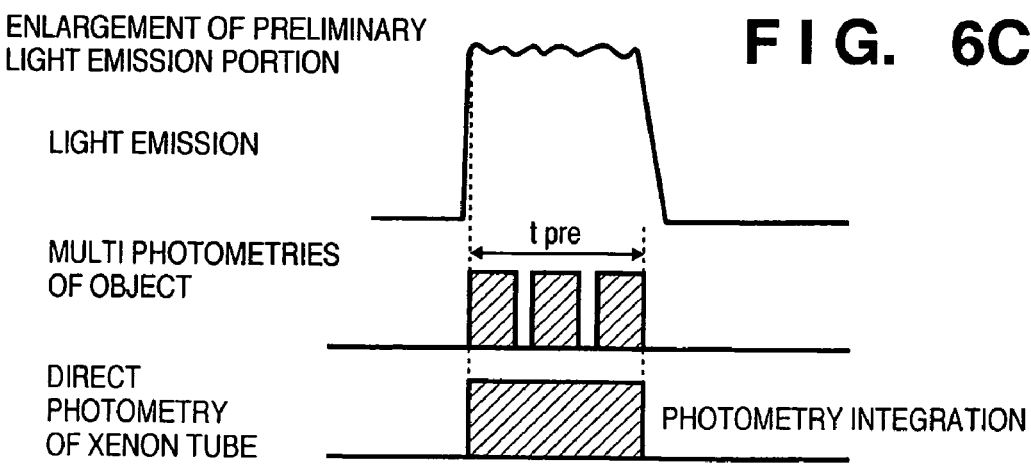

CAMERA AND CONTROL METHOD THEREFOR

FIELD OF THE INVENTION

The present invention relates to a camera which automatically adjusts the amount of light emitted from an auxiliary light source such as an electronic flash.

BACKGROUND OF THE INVENTION

In general, TTL (Through The Lens) flash exposure, the amount of light emitted from an auxiliary light source is determined by photometering reflect light from a film surface. However, since different types of films have different reflectances, the amount of light emitted which is determined on the basis of reflect light may become unstable. A digital single-lens reflex camera which uses an image sensing device in place of a film cannot virtually use this scheme because almost no reflect light can be obtained from the image sensing device.

The present applicant has proposed a camera system to solve this problem (Japanese Patent Laid-Open No. 9-61883). This camera system performs preliminary light emission toward an object and photometers reflect light from the object upon preliminary light emission by using a first photometry means. At the same time, the camera system photometers direct light upon preliminary light emission by using a second photometry means, and performs flash exposure in accordance with the photometric value of the reflect light and the photometric value of the direct light.

A compact digital camera has no mirrors like those in a single-lens reflex camera, and hence can perform flash exposure by directly using a CCD for image sensing operation. Patent reference 2 discloses an invention designed to perform flash exposure while eliminating the influence of flicker from a fluorescent lamp by photometering reflect light upon preliminary light emission only once after setting the shutter speed of an electronic shutter associated with a CCD to $1/1500$.

In a press conference or wedding ceremony, many cameramen take many photographs of one object. Assume that while a first camera system is executing preliminary light emission and photometry, a second camera system executes main light emission. In this case, the first camera system cannot correctly perform photometry upon self preliminary light emission.

In addition, as described above, if the second camera system is a camera system designed to perform preliminary light emission, not only main light emission from another camera system but also preliminary light emission from another camera system may overlap preliminary light emission from the first camera system. This further increases the probability that photometry cannot be correctly performed. Obviously, if the first camera system is influenced by light emission from another camera system, underexposure occurs relative to a proper value.

As in the invention disclosed in Japanese Patent Laid-Open No. 10-32750, according to a method of photometering preliminary light emission only once upon setting the shutter speed to $1/1500$, if another camera system emits light at the instant of photometry, the influence of the light emission cannot be reduced.

SUMMARY OF THE INVENTION

According to the present invention, in a camera designed to perform preliminary light emission before main light emission, photometry is performed a plurality of number of times upon preliminary light emission, and flash exposure is performed by suppressing photometric values which may have been influenced by light emission as disturbance other than the preliminary light emission.

According to the present invention, even if, for example, light from an auxiliary light source operated by another cameraman overlaps during preliminary light emission, the influence of this light can be reduced as compared with the prior art.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A, 6B, and 6C are graphs each exemplifying the relationship between a light emission timing and a photometry timing according to the embodiment;

DETAILED DESCRIPTION OF THE PREFERRED EMBODIMENTS

Preferred embodiments of the present invention will now be described in detail in accordance with the accompanying drawings.

FIRST EMBODIMENT

Figure 1:
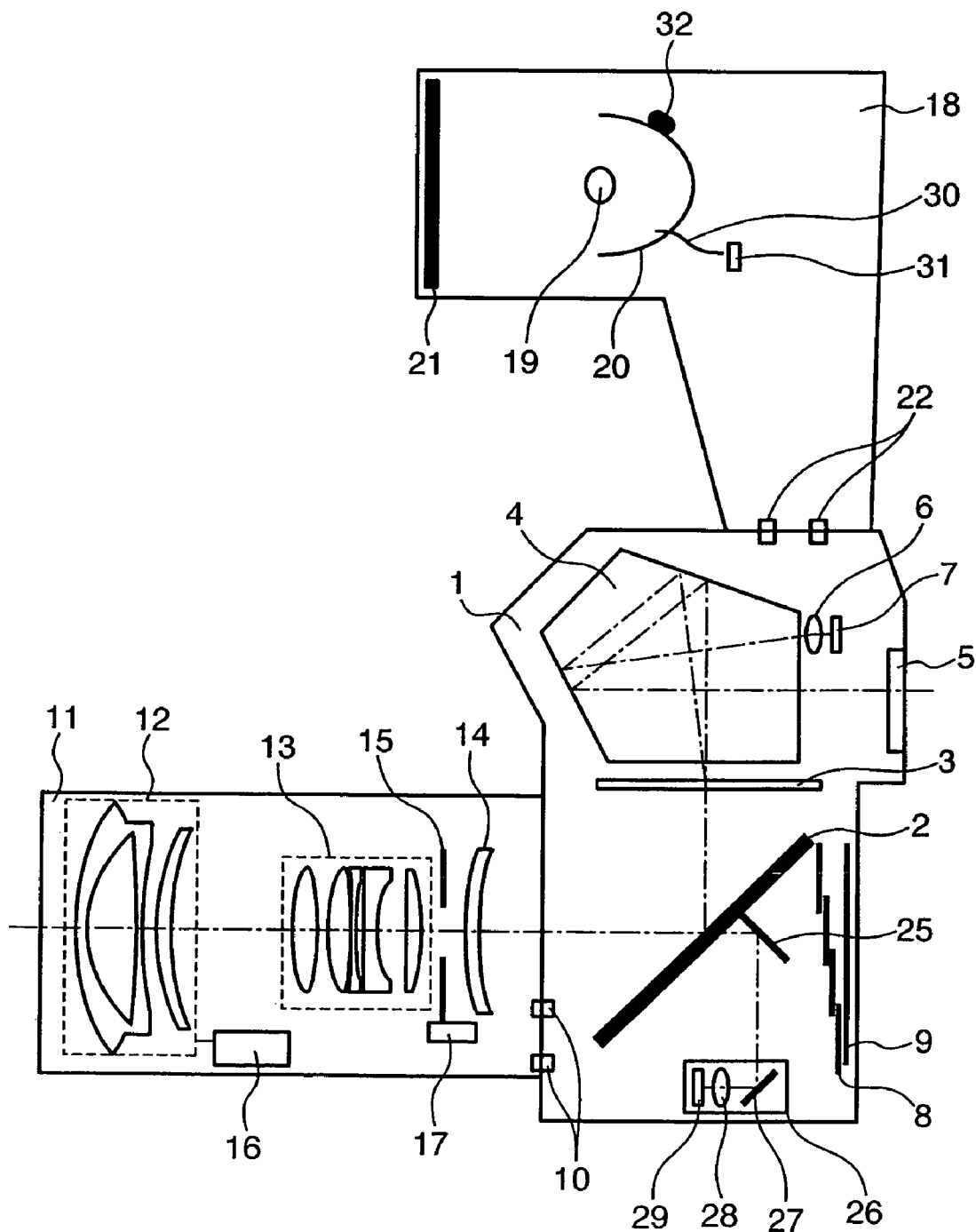
FIG. 1 is a cross-sectional view mainly showing an example of the optical arrangement of a camera system according to an embodiment.

FIG. 1 is a cross-sectional view mainly showing an example of the optical arrangement of a camera system according to an embodiment. Reference numeral 1 denotes a camera body in which optical components required for photography, mechanical components, an electric circuit, a film, and the like are housed. A main mirror 2 is obliquely inserted into a photographing optical path or retracted from it in accordance with an observation state and a photographic state. The main mirror 2 is a half mirror. Therefore, while the mirror is obliquely inserted in the photographing optical path, about 50% of a light beam from an object is guided to a sub-mirror 25 placed on the back surface of the main mirror 2 in a focus detection optical system.

Reference numeral 3 denotes a focusing plate (focal plane plate) placed on an expected imaging surface of photographing lenses 12 to 14; 4, a pentagonal prism for changing the viewfinder optical path; and 5, a viewfinder. A photographer can see a photographic frame by visually recognizing the focusing plate 3 through the viewfinder 5. Reference numeral 6 denotes an imaging lens for measuring an object brightness within a photographic frame; 7, a multi-division photometry sensor which receives light passing through the imaging lens 6; 8, a focal plane type shutter; and 9, a film as a photosensitive member. It is obvious that in a digital camera system, an image sensing device is placed in place of a film.

The camera body 1 is electrically coupled to the photographing lens through a mount contact 10 functioning as an interface. The photographing lens comprises a lens barrel 11, a first group lens 12, a second group lens 13, a third group fixed lens 14, and a stop 15 placed between the second group lens 13 and the third group fixed lens 14. The first group lens 12 is a focusing lens which moves back and forth on the optical axis. With this lens, a focal position on a photographic frame can be adjusted. Likewise, the second group lens 13 can move back and forth on the optical axis. In accordance with this movement, zooming of a photographic frame is performed. The first group lens 12 is driven by a motor 16. The stop 15 is driven by a motor 17.

An accessory shoe 22 is provided on the upper surface of the housing portion of the pentagonal prism 4. An external electronic flash 18 can be mounted on the accessory shoe 22. The external electronic flash 18 comprises a xenon tube 19, a reflecting plate 20 mounted on the back surface of the xenon tube 19, and a Fresnel lens 21 mounted in front of the xenon tube 19. One end of a glass fiber 30 is inserted into a portion of the reflecting plate 20, and a sensor 31 (PD1) such as a light-receiving element for monitoring light emitted by the xenon tube 19 is connected to the other end of the glass fiber 30. In this manner, direct light from the xenon tube 19 is photometered through the glass fiber 30 to reduce the influence of light emission from another camera system with respect to the photometric value of the direct light. Likewise, a sensor 32 (PD2) such as a light-receiving element for monitoring light is connected to the reflecting plate 20. The sensor 32 is used to perform flat light emission by limiting a light emission current for the xenon tube 19. Obviously, in place of the xenon tube 19, another light source such as a white LED can be used.

A focus detection unit 26 is mounted near the bottom portion of the camera body 1 which is located on the exit optical path of the sub-mirror 25. The focus detection unit 26 comprises a secondary imaging mirror 27, secondary imaging lens 28, focus detection line sensor 29, and the like. The optical system is adjusted to form a secondary imaging surface on the detection surface of the focus detection line sensor 29. The focus detection unit 26 is used to detect the focus state of an object within a photographic frame by a known phase difference detection method and control the focus adjustment mechanism of the photographing lens.

Figure 2:
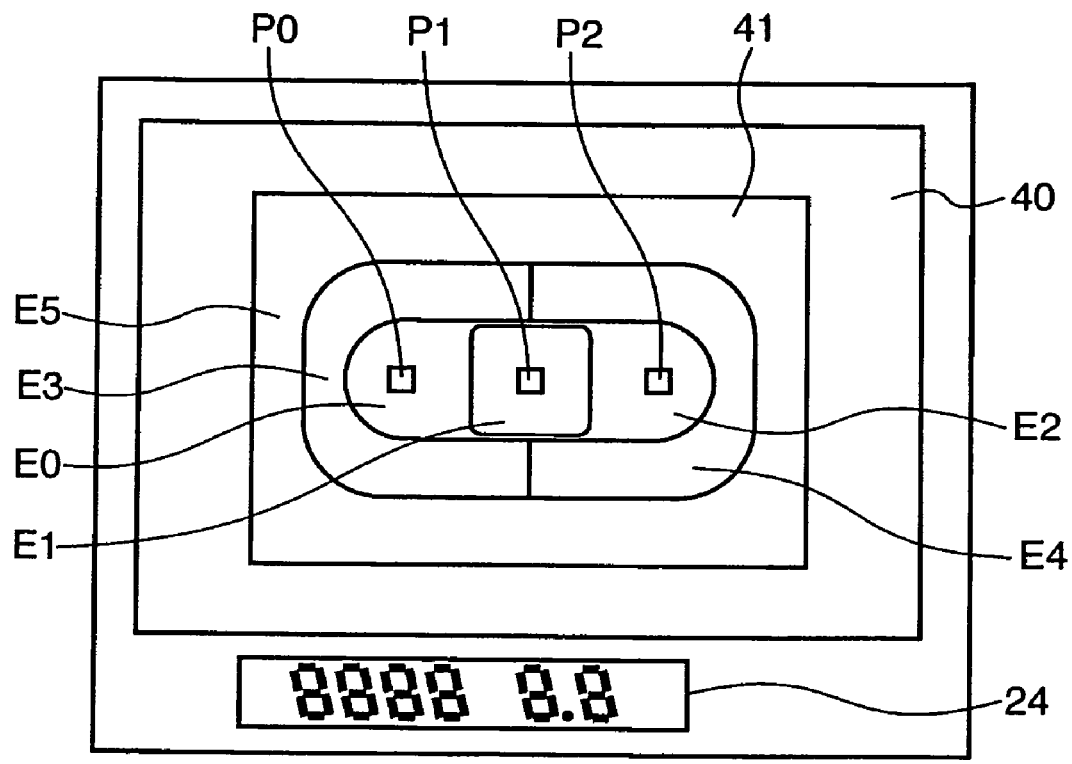
FIG. 2 is a view showing an example of how a photometry area is divided according to the embodiment.

FIG. 2 is a view showing an example of how a photometry area is divided according to the embodiment. Referring to FIG. 2, reference numeral 40 denotes an overall photographic frame; and 41, a photometry area on a photographic frame of the multi-division photometry sensor 7. In this case, the photographic frame is divided into six areas E0 (a left portion), E1 (a middle portion), E2 (a right portion), E3 (a left half on the outside of E0, E1, and E2), E4 (a right half on the outside of E0, E1, and E2), and E5 (a portion on the outside of E3 and E4). Photometry points P0, P1, and P2 are respectively set in the centers of the three areas E0, E1, and E2. An intra-viewfinder LCD 24 is provided on the lower portion of the photographic frame 40 to display a shutter speed, an F-number, and the like.

Figure 3A:
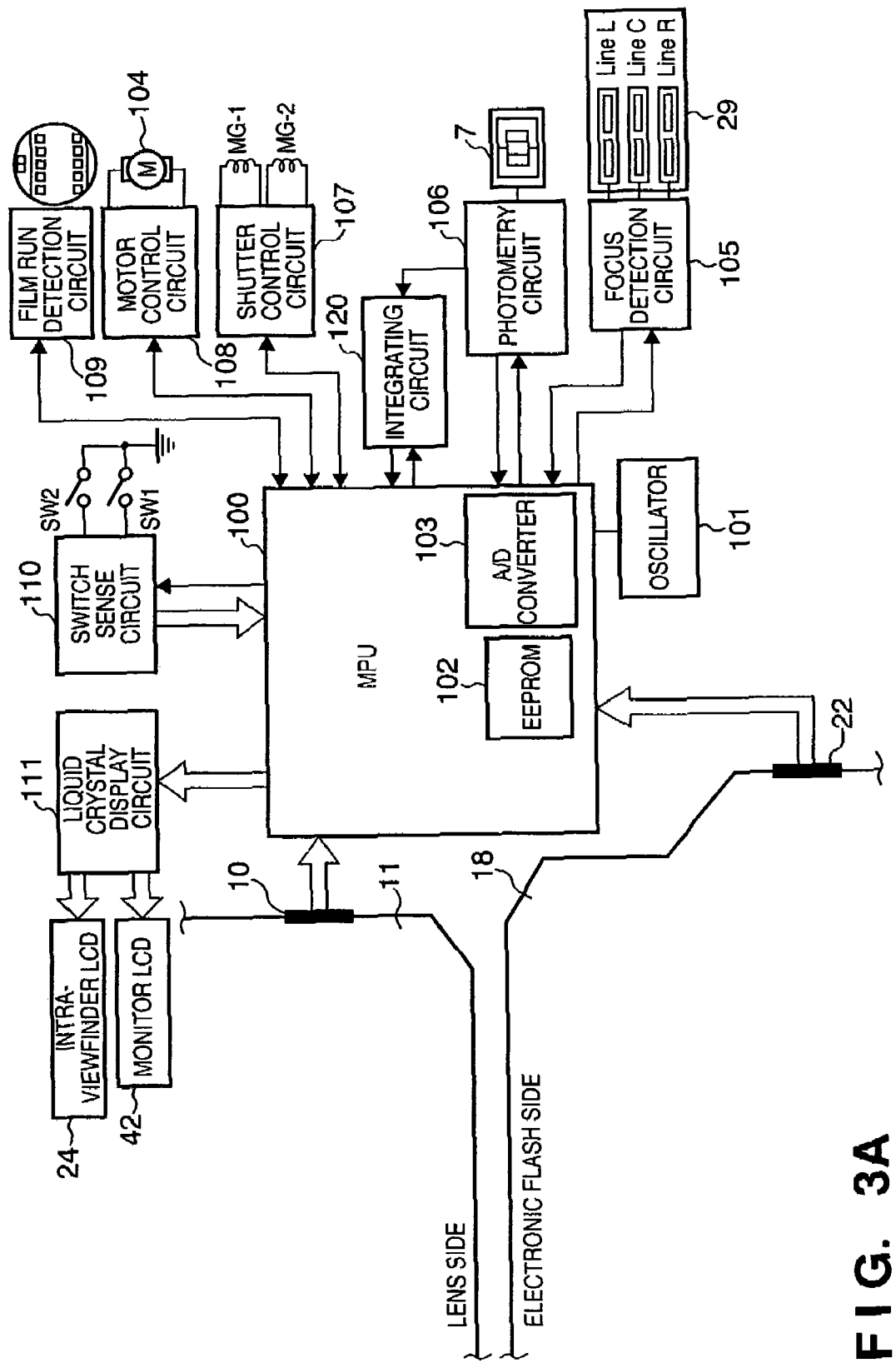
FIGS. 3A, 3B, and 3C are block diagrams each showing the arrangement of an electrical system in the camera system according to the embodiment.
Figure 3B:
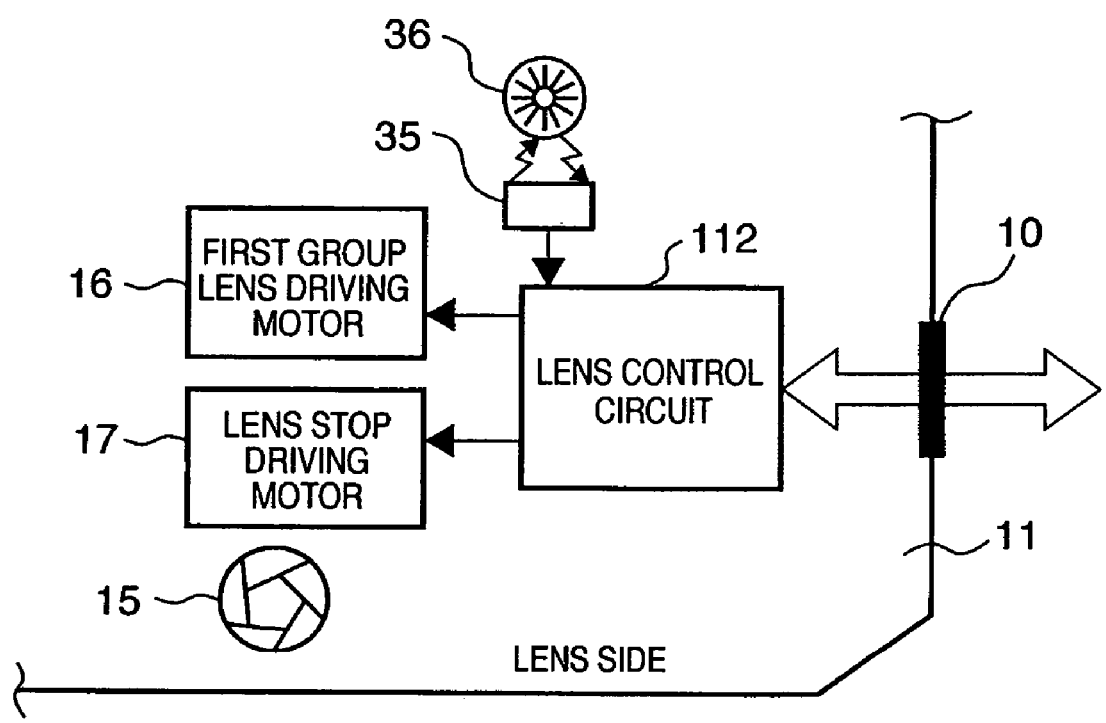
Figure 3C:
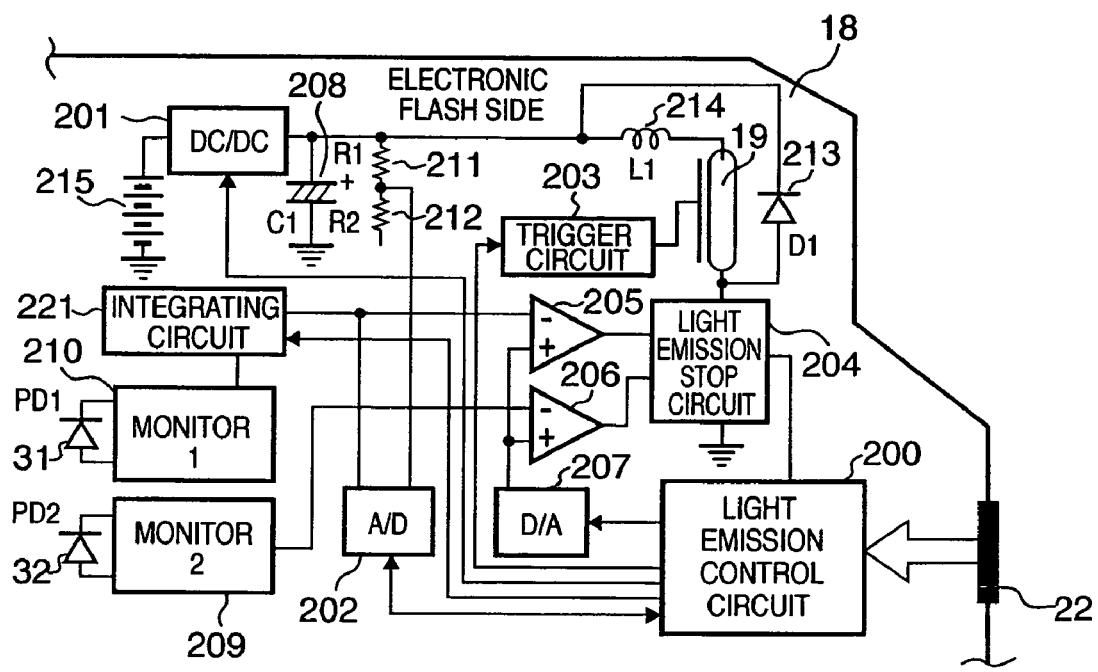

FIGS. 3A, 3B, and 3C are block diagrams each showing the arrangement of an electrical system in the camera system according to the embodiment. More specifically, FIG. 3A shows the electrical system of the camera body. FIG. 3B shows an electrical system on the lens side. FIG. 3C shows an electrical system on the electronic flash side. The portions which have already been described will be denoted by the same reference numerals for the sake of simple explanation.

An MPU (Micro Processor Unit) 100 executes various control operations in synchronism with clock signals supplied from an oscillator 101. An EEPROM 102 built into the MPU 100 is a semiconductor memory for storing film counter information and other photography information. Obviously, a semiconductor memory such as a RAM may be built into the MPU 100. In addition, an A/D converter 103 A/D-converts analog signals from a focus detection circuit 105 and the multi-division photometry sensor 7. The MPU 100 then processes the resultant signals.

The focus detection circuit 105, a photometry circuit 106, a shutter control circuit 107, a motor control circuit 108, and a film run detection circuit 109 are connected to the MPU 100. In addition, a switch sense circuit 110 for detecting an operation state, a liquid crystal display circuit 111 which drives the LCD 24 mounted in the viewfinder and a monitor LCD 42, and the like are connected to the MPU 100.

The focus detection circuit 105 performs accumulation control and read control on the focus detection line sensor 29 in accordance with signals from the MPU 100, and outputs each pixel information to the MPU 100. The photometry circuit 106 outputs, to the MPU 100, a brightness signal in each area in a frame which is obtained by the multi-division photometry sensor 7. The MPU 100 A/D-converts each brightness signal and executes exposure adjustment for photography.

An integrating circuit 120 is a circuit which integrates the photometric values in the respective areas of the multi-division photometry sensor 7 which are output from the photometry circuit 106. An integration time (timing) is based on an instruction from the MPU 100. The integrating circuit 120 can ensure a wide dynamic range by integrating photometric values while compressing them. Note that in flat light emission, slight variations occur in peak value due to ripples even in a stable state. However, obtaining a photometric value by integral computation makes it possible to perform photometry with higher precision than in a type which performs photometry of fixed light a plurality of number of times and averaging the resultant values.

The shutter control circuit 107 executes exposure operation by making the front-curtain shutter magnet (MG-1) and the rear-curtain shutter magnet (MG-2) travel in accordance with signals from the MPU 100. The motor control circuit 108 controls a motor 104 in accordance with signals from the MPU 100 to obliquely insert/retract (up/down) the main mirror 2, charge the shutter 8, and feed the film 9. The film run detection circuit 109 detects whether the film 9 is wound up by one frame at the time of film feeding operation, and sends out the detection result as a signal to the MPU 100.

The focus detection line sensor 29 is connected to the focus detection circuit 105. The shutter magnets MG-1 and MG-2 are connected to the shutter control circuit 107. The motor 104 serving as a drive source for film wind-up operation and the like is connected to the motor control circuit 108. Switches SW1 and SW2 are connected to the switch sense circuit 110. The switch SW1 is turned on when a release button (not shown) is pressed to the first stroke, thereby starting photometry and AF (Auto Focus). The switch SW2 is turned on when the release button is pressed to the second stroke, thereby starting exposure operation. The ON operations of the switches SW1 and SW2 are detected by the switch sense circuit 110. The detection results are sent out to the MPU 100.

The line sensor 29 is a known CCD line sensor comprising three line sensors Line-L (left), Line-C (center), and Line-R (right) corresponding to three distance measurement points on the viewfinder, as described above.

The lens barrel 11 is connected to the camera body 1 having the above arrangement through the mount contact 10. The lens barrel 11 incorporates a lens control circuit 112. Signals are transmitted/received between the lens control circuit 112 and the MPU 100. The motors 16 and 17 and a photodetector 35 are connected to the lens control circuit 112. The photodetector 35 is used in combination with a pulse plate 36 in which slits are formed at predetermined intervals in the form of a disk. When the pulse plate 36 rotates in accordance with the movement of the first group lens 12, the photodetector 35 counts slits. This allows the MPU 100 to acquire the position information of the first group lens 12 and adjust the focus of the lens.

The external electronic flash 18 is connected to the camera body 1 through the accessory shoe 22. The external electronic flash 18 comprises a light emission control circuit 200 for controlling each circuit in the external electronic flash 18. The light emission control circuit 200 is a circuit for emitting flash light to the object on the basis of a signal from the MPU 100.

Reference numeral 201 denotes a DC/DC converter which boosts the voltage of a battery 215. The DC/DC converter 201 boosts a battery voltage in accordance with an instruction from the light emission control circuit 200, and can store a voltage of about 300 V in a main capacitor 208 (C1).

Resistors 211 and 212 (R1 and R2) are voltage-dividing resistors which are provided to allow the light emission control circuit 200 to monitor the voltage of the main capacitor 208. The light emission control circuit 200 monitors the voltage of the main capacitor 208 by causing an A/D converter 202 to A/D-convert the voltage divided by the voltage-dividing resistors 211 and 212. With this operation, the light emission control circuit 200 stops the DC/DC converter 201 to stop boosting operation or transfers the current charged voltage value to the MPU 100 on the camera body 1 side. A trigger circuit 203 receives an instruction from the MPU 100 through the light emission control circuit 200, and applies a high voltage to the trigger electrode of the xenon tube 19 to cause the xenon tube 19 to discharge. With this operation, the charge energy stored in the main capacitor 208 is discharged as light energy through the xenon tube 19.

A light emission stop circuit 204 is turned on when a trigger signal is output from the trigger circuit 203. Thereafter, the light emission stop circuit 204 is turned off to stop light emission from the xenon tube 19 in accordance with outputs from comparators 205 and 206 and a signal from the light emission control circuit 200. When the light emission stop circuit 204 is turned off, a circulating loop is formed by the xenon tube 19, a diode 213 (D1), and a coil 214 (L1). For this reason, the amount of light emitted does not quickly decrease. Note that flat light emission can be performed by continuously turning on/off the light emission stop circuit 204 in short cycles.

A D/A converter 207 is connected between the light emission control circuit 200 and the comparators 205 and 206. Reference numeral 209 denotes a second monitor circuit which is connected to the sensor 32 (PD2) and amplifies an output from the sensor 32; and 210, a first monitor circuit which is connected to the sensor 31 (PD1) and amplifies an output from the sensor 32. An integrating circuit 221 integrates output voltages from the first monitor circuit 210, and applies the resultant value to the comparator 205.

[Flat Light Emission]

Various kinds of operations of the external electronic flash 18 will be individually described next. The light emission control circuit 200 sets a predetermined value in the D/A converter 207. At this time, since the xenon tube 19 has not started light emission, the sensor 32 (PD2) detects a small photocurrent. This indicates that an output from the second monitor circuit 209 which is input to the inverting input terminal of the comparator 206 is low. The comparator 206 therefore outputs an "H"-level output to the light emission stop circuit 204. When a trigger signal is output from the trigger circuit 203, the xenon tube 19 starts light emission. The peak value of light emission quickly increases. The sensor 32 detects more photocurrent. Accordingly, the output from the second monitor circuit 209 increases. Finally, the output from the comparator 206 is set at "L" level.

When the output from the comparator 206 is set at "L" level, the light emission stop circuit 204 operates to disconnect the discharge loop of the xenon tube 19. Owing to the above circulating loop, however, the peak value does not quickly decrease but gradually decreases. As the peak value decreases, the sensor 32 detects less photocurrent. The output from the comparator 206 changes to "H" level again to form the discharge loop of the xenon tube 19, thereby setting the peak value in the increasing direction.

As the peak value repeatedly increases and decreases in short cycles in accordance with outputs from the comparator 206 in this manner, flat light emission is realized. When the light emission control circuit 200 outputs a stop signal to the light emission stop circuit 204, the flat light emission is stopped. In addition, controlling a digital value to be supplied to the D/A converter 207 makes it possible to input different voltages to the non-inverting input terminal of the comparator 206. Changing the operation point of a photocurrent in the sensor 32 makes it possible to control the peak value of flat light emission to a desired value.

[Preliminary Light Emission and Integration Processing]

Preliminary light emission is achieved by performing flat light emission with a predetermined peak value for a predetermined period of time. In parallel with preliminary light emission, the sensor 31 (PD1) photometers the brightness of direct light emitted from the xenon tube 19. The light emission control circuit 200 issues an integration start instruction to the integrating circuit 221. The integrating circuit 221 starts integration for preliminary light emission in accordance with an output from the monitor 210. The integrating circuit 221 is configured to logarithmically compress a photometric amount and integrate the compressed value. When preliminary light emission is performed for a predetermined period of time, an output from the integrating circuit 221 is converted by the A/D converter 202. The resultant digital signal is read out by the light emission control circuit 200.

Reflect light from the object upon preliminary light emission is received by the multi-division photometry sensor 7. The integrating circuit 120 integrates the brightness values output from the photometry circuit 106 connected to the multi-division photometry sensor 7. In this embodiment, since reflect light from the object upon preliminary light emission is photometered a plurality of number of times, the integrating circuit 120 outputs a plurality of integral photometric values to the MPU 100 in accordance with an instruction from the MPU 100.

[Main Light Emission Control]

The MPU 100 obtains the proper integral value of a main light emission amount on the basis of the integral value of preliminary light emission (direction light) and an object reflect light brightness value at the time of preliminary light emission (an output from the multi-division photometry sensor 7), and sets the obtained proper integral value in the D/A converter 207 through the light emission control circuit 200. Thereafter, the integrating circuit 221 returns to the initial state, and the trigger circuit 203 causes the xenon tube 19 to start light emission. The brightness at the time of this light emission is photometered by the sensor 31. Instantaneous photometric values are integrated by the integrating circuit 221. When the value obtained by integration reaches a preset proper integral value, an output from the comparator 205 switches from "H" level to "L" level, and the light emission stop circuit 204 performs light emission stop processing. At this time, the output from the comparator 206 is neglected by a signal from the light emission control circuit 200. In the above manner, in main light emission following preliminary light emission, the amount of light emitted is controlled to the proper amount of light emitted which is obtained by computation.

Figure 4:
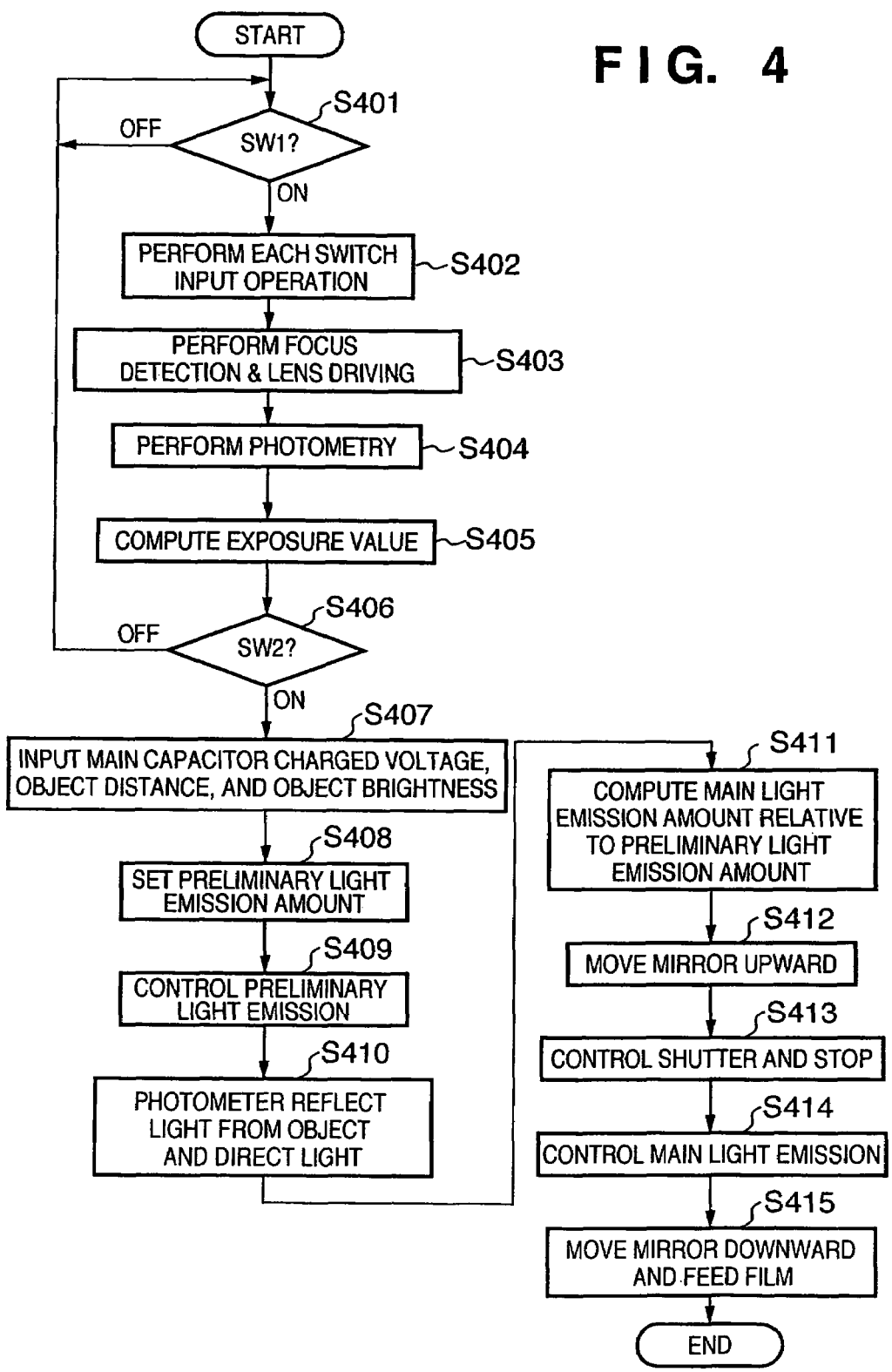
FIG. 4 is a flowchart exemplifying basic photography processing in the camera system according to the embodiment.

FIG. 4 is a flowchart exemplifying basic photography processing in the camera system according to the embodiment. In step S401, the MPU 100 detects, in accordance with the first stroke of the release button, that the switch SW1 is turned on. Upon detecting that the switch SW1 is turned on, the MPU 100 reads the states of other operation switches (not shown) through the switch sense circuit 110 in step S402, thereby setting various photography modes such as the modes of determining a shutter speed and an aperture value. For example, the MPU 100 determines an exposure value (EV=TV+AV) based on a shutter speed (to be referred to as a TV hereinafter) and an F-number (to be referred to as an AV hereinafter) from the photography mode set in accordance with a photographer's intention or an EV corresponding to an object brightness. In step S403, the MPU 100 executes focus detection operation by the phase difference detection method and accompanying lens driving operation.

In step S404, the MPU 100 photometers the brightness of the object under natural light using the photometry circuit 106. With this operation, object brightness values in the six areas on the frame can be obtained. Assume that a photometric value is a logarithmically compressed value (EV). In step S405, the MPU 100 determines an exposure value from a known algorithm on the basis of the object brightness values in the six areas, and determines a time value and an aperture value in accordance with the set photography mode. In step S406, the MPU 100 discriminates whether the switch SW2, which operates when the release button is pressed to the second stroke, is turned on. If the switch SW2 is OFF, the flow returns to step S401.

If the switch SW2 is ON, the MPU 100 acquires charged voltage information Vc of the main capacitor 208 at present from the light emission control circuit 200 by information transfer. The MPU 100 also acquires absolute distance information Dist of the object from the camera by information transfer from the lens control circuit 112. In addition, the MPU 100 acquires object brightness information EVa immediately before preliminary light emission from the photometry circuit 106.

The reason why photometry and computation are performed in step S407 in the same manner as in step S404 will be described below. This is because there is a possibility that the state of the object at the time when the switch SW2 is turned on may have changed from the state of the object at the time when the switch SW1 is turned. When, for example, the photographer changes the framing, the state of the object changes.

The photometry time in step S407 is preferably set to be shorter than that in step S404. This is because, in order to minimize the influence of flicker under a fluorescent lamp, it is preferable that in the photometry processing in step S404, photometry be performed repeatedly for a relatively long period of time, and the resultant photometric values be averaged. In contrast to this, in the photometry processing in step S407, in order to reduce the release time lag and the like, a photometry time as short as in photometry in preliminary light emission must be set, and the time interval from the photometry time in step S407 to the photometry time in the preliminary light emission must be minimized.

In step S408, the MPU 100 determines the amount of light emitted in preliminary light emission on the basis of the acquired charged voltage information Vc, absolute distance information Dist, and object brightness information EVa. In step S409, the MPU 100 issues a command to the light emission control circuit 200 to control preliminary light emission so as to set the determined values. In step S410, the MPU 100 causes the multi-division photometry sensor 7 to perform photometry at the same time with preliminary light emission. In this embodiment, in particular, the MPU 100 performs photometry for reflect light from the object upon preliminary light emission a plurality of number of times, and suppresses photometric values of a plurality of obtained photometric values which may have been influenced by light emission from other camera systems.

It should be noted that the term "suppress/suppression" is used in this application to express any process which reduces or eliminates an influence on any other element.

Note that the MPU 100 preferably photometers the brightness of the object by using the multi-division photometry sensor 7 immediately before preliminary light emission. This is because, the difference between the photometric value immediately before preliminary light emission and the photometric value upon the preliminary light emission is computed to obtain the photometric value of object reflect light produced by the preliminary light emission alone. In addition, as will be described later, the photometric value immediately before the preliminary light emission can be used to detect the presence of flash light from another camera system to perform mode switching at the time of preliminary light emission.

In addition, the light emission control circuit 200 photometers direct light from the xenon tube 19 through the sensor 31, concurrently with preliminary light emission, and performs integration by using the integrating circuit 221. The light emission control circuit 200 then A/D-converts the integral value at the end of the preliminary light emission, and reads in the resultant value.

In step S411, the MPU 100 calculates a proper integral value for main light emission from the integral value in the preliminary light emission, the object reflect light photometric value in the preliminary light emission, an exposure value, and the like. The present invention is not greatly influenced by any specific calculation method for a proper integral value, and hence can use various calculation methods. For example, as disclosed in detail in Japanese Patent Laid-Open No. 9-61913, the present invention can use a method (step S511 in this reference) of calculating a proper integral value for main light emission with respect to preliminary light emission by executing main light emission proper ratio computation (step S509 in the reference).

In step S412, the MPU 100 moves the main mirror 2 upward before exposure operation, and retracts the sub-mirror 25 from the photographing optical path, thereby allowing an object image to reach the film 9 without being interfered. In step S413, the MPU 100 issues a command to the lens control circuit 112 to set the aperture value based on the determined exposure amount, and drives the shutter control circuit 107 to set the determined shutter speed value.

In step S414, the MPU 100 controls the light emission control circuit 200 to perform main light emission during exposure operation in accordance with driving of the shutter 8. This main light emission is controlled to set the amount of light emitted which is obtained by the computation in step S411. When the exposure operation is complete in this manner, the MPU 100 restores the main mirror 2 and sub-mirror 25 which have been retracted from the photographing optical path, and operates the motor control circuit 108 and the film run detection circuit 109 to wind up the film 9 by one frame in step S415. With this operation, the light emission control is terminated.

Figure 5:
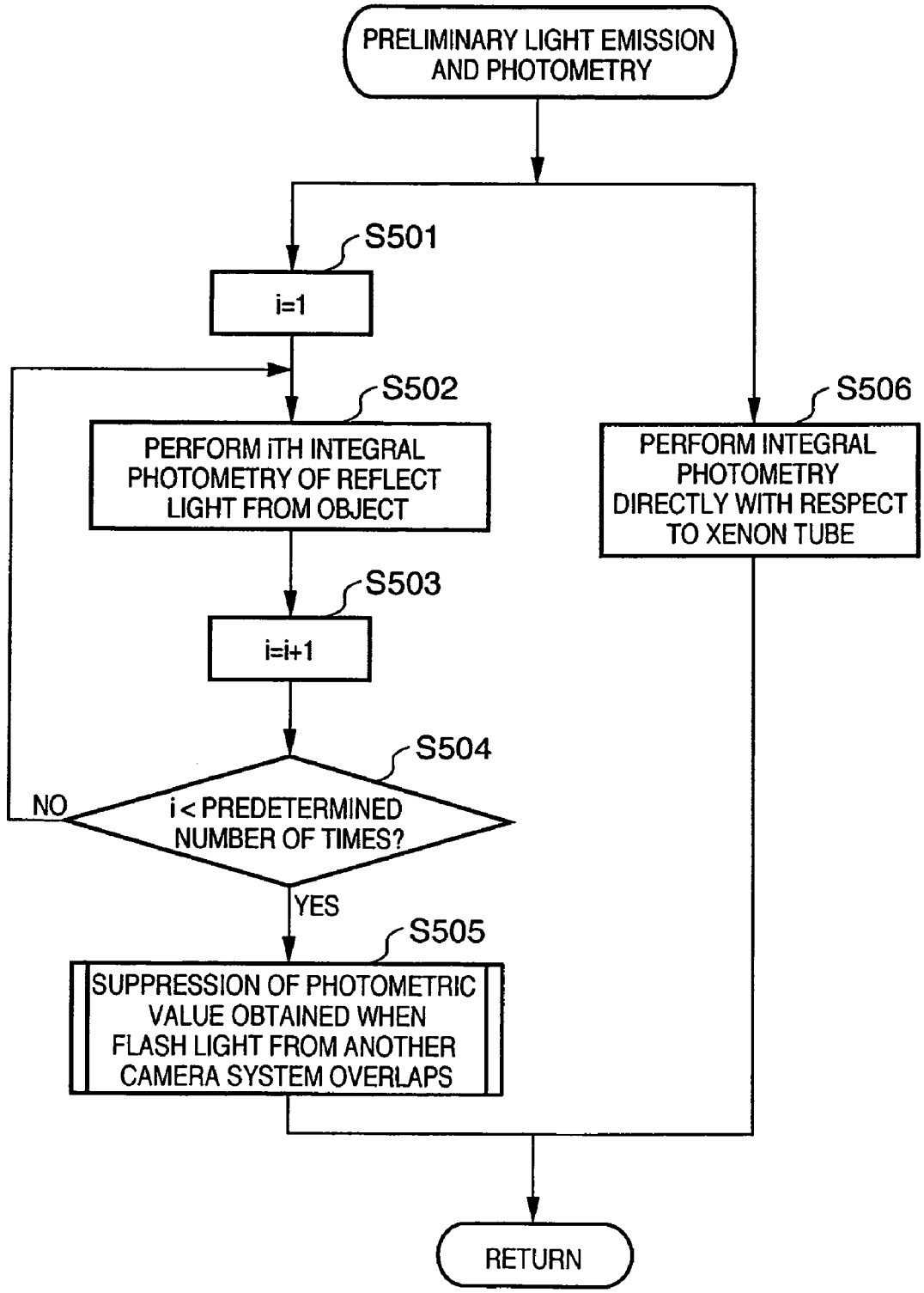
FIG. 5 is a flowchart exemplifying preliminary light emission and photometry processing according to the embodiment.

FIG. 5 is a flowchart exemplifying preliminary light emission and photometry processing according to the embodiment. According to this flowchart, photometry processing for reflect light from an object (S501 or S505) is executed concurrently with processing of directly photometering light emission from the xenon tube (S506). This flowchart corresponds to the subroutine in step S410 described above.

In step S501, the MPU 100 sets a value i of the counter to 1 so as to photometer reflect light from the object upon preliminary light emission a plurality of number of times. In step S502, the MPU 100 performs the ith integral photometry with respect to reflect light from the object. That is, brightness values output from the photometry circuit 106 are integrated by the integrating circuit 120. In step S503, the MPU 100 increments the value i of the counter by 1. In step S504, the MPU 100 determines whether the counter value i exceeds a predetermined number of times. If the counter value i exceeds the predetermined number of times, the flow advances to step S505. If the counter value i is equal to or less than the predetermined number of times, the flow returns to step S502 to execute next photometry.

In step S505, the MPU 100 executes suppression processing with respect to photometric values, of a plurality of acquired photometric values, on which flash light beams from other camera systems seem to have been superimposed. This makes it possible to reduce the influence of the flash light beams from other camera systems on photometric values of a preliminary light emission amount and finally execute proper flash exposure of main light emission.

FIGS. 6A to 6C are graphs each exemplifying the relationship between a light emission timing and a photometry timing according to the embodiment. More specifically, FIG. 6A shows variations (flicker) in the amount of light from the fluorescent lamp, the timings of preliminary light emission and main light emission from the xenon tube, the photometry timing of reflect light from the object, and the timing of direct photometry from the xenon tube. The photometry time for background light in step S404 is set to be relatively long to prevent the influence of flicker. In this case, the photometry time for preliminary light emission is represented by tpre [sec]. TV represents an exposure time corresponding to a shutter speed.

FIG. 6B shows the light emission timing when photometry is not performed a plurality of number of times upon preliminary light emission, the photometry timing for object reflect light, and the photometry timing for direct light from the xenon tube 19. FIG. 6C shows the light emission timing when photometry is performed a plurality of number of times upon preliminary light emission, the photometry timing for object reflect light, and the photometry timing for direct light from the xenon tube. As is obvious from comparison between FIGS. 6B and 6C, when photometry is performed a plurality of number of times upon preliminary light emission, the photometry time per photometry is short.

Figure 7:
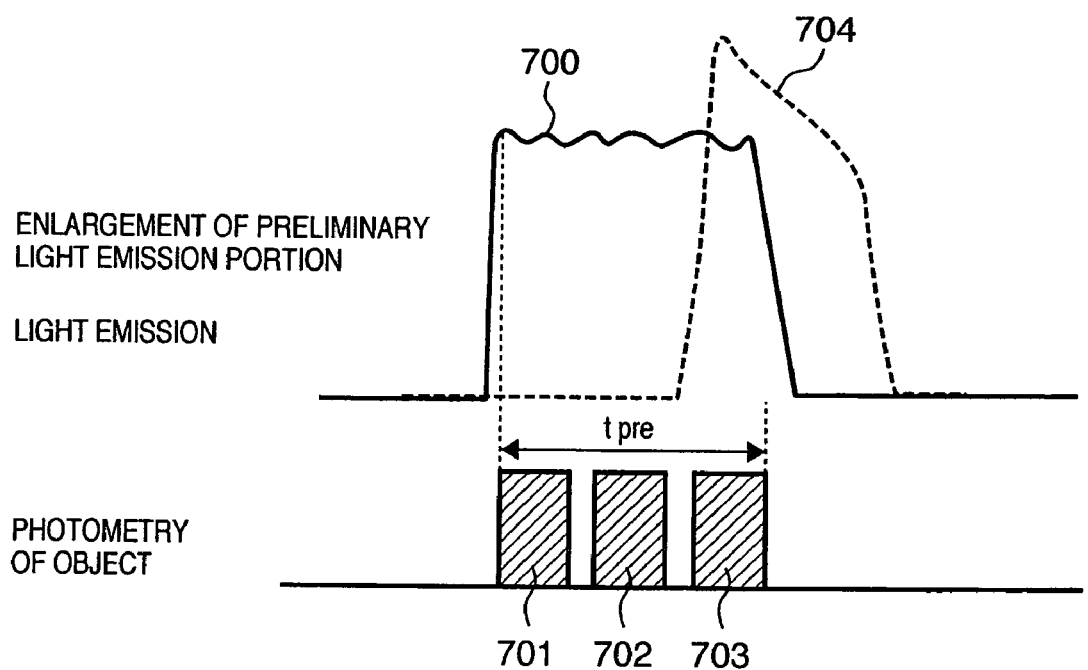
FIG. 7 is a graph showing the relationship between photometry performed a plurality of number of times upon preliminary light emission and light emission from another camera system according to the embodiment.

FIG. 7 is a view showing the relationship between photometry performed a plurality of number of times upon preliminary light emission and light emission from another camera system according to the embodiment. Referring to FIG. 7, during preliminary light emission 700, light emission 704 from another camera system overlaps. For this reason, a third photometric value 703 of three photometric values (701, 702, and 703) of object reflect light is influenced by the light emission 704 from another camera system, and hence is a suppression target.

[Concrete Example of Suppression Processing]

Figure 8:
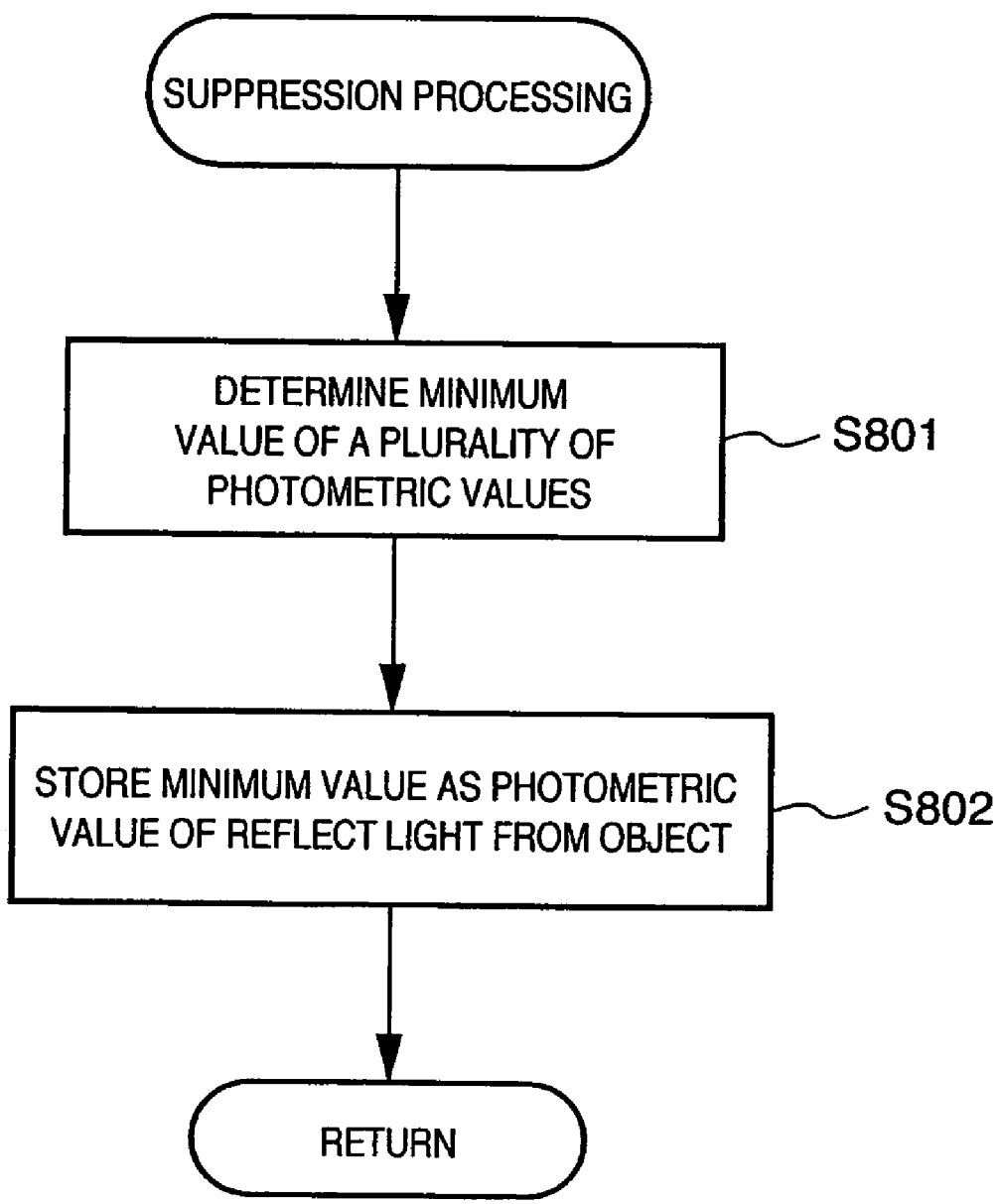
FIG. 8 is a flowchart exemplifying suppression processing according to the embodiment.

FIG. 8 is a flowchart exemplifying suppression processing according to the embodiment. This flowchart corresponds to step S505 described above. In step S801, the MPU 100 reads out a plurality of photometric values from the EEPROM 102 or a RAM (not shown), and determines the minimum value of the readout values by comparison computation or the like. In general, when light emission from another camera system overlaps preliminary light emission, the photometric value at this time increases without fail. As a consequence, the minimum photometric value is least influenced by light emission from another camera system. In step S802, the MPU 100 stores the determined minimum value in the EEPROM 102 or the RAM (not shown). It is obvious that this minimum value is read out and used by the MPU 100 when a proper integral value for main light emission is calculated.

Figure 9:
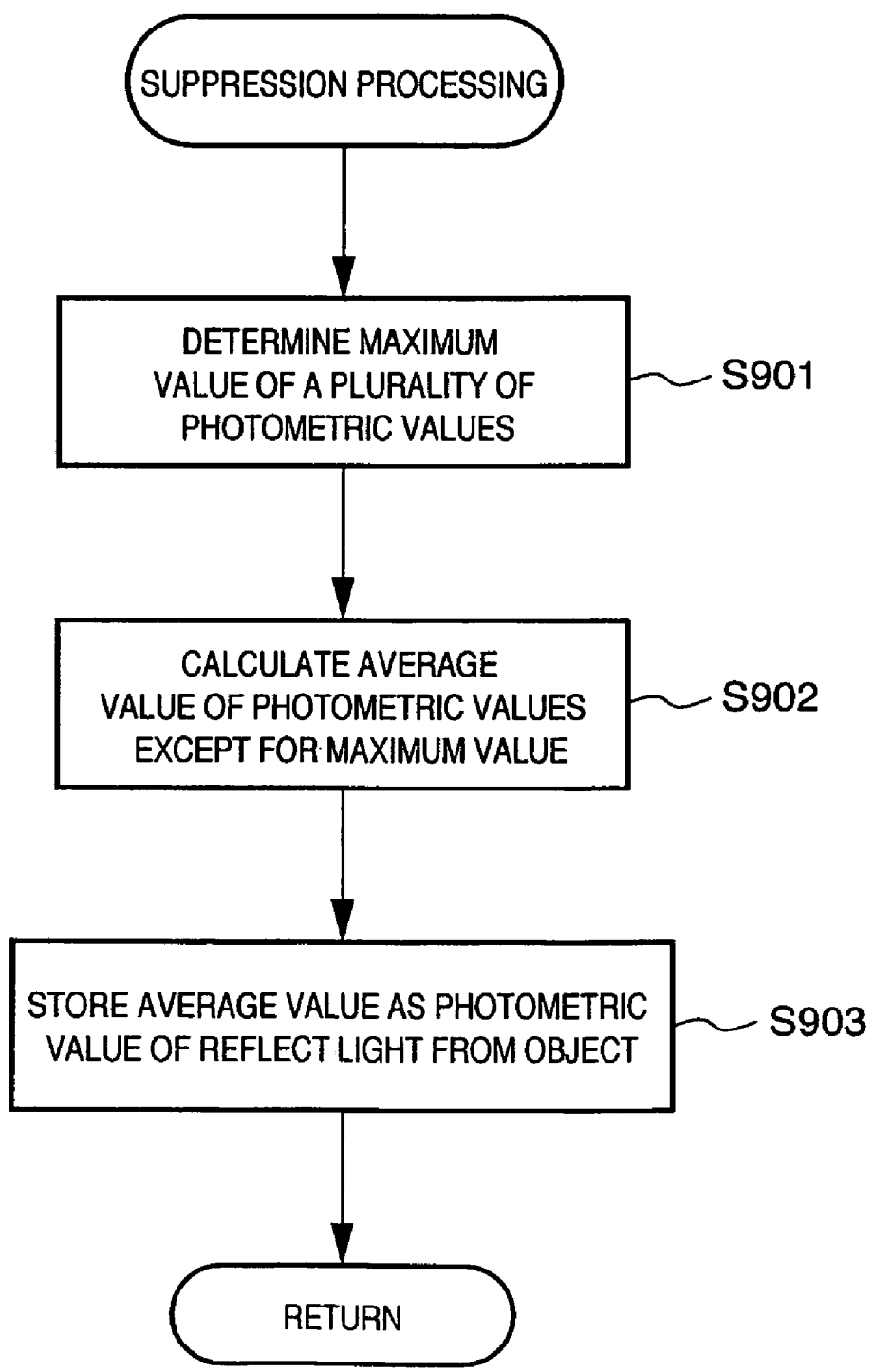
FIG. 9 is a flowchart exemplifying another suppression processing according to the embodiment.

FIG. 9 is a flowchart exemplifying another suppression processing according to the embodiment. This flowchart corresponds to step S505 described above. In step S901, the MPU 100 reads out a plurality of photometric values from the EEPROM 102 or the RAM (not shown), and determines the maximum value of the readout values by comparison computation or the like. In general, when light emission from another camera system overlaps preliminary light emission, the photometric value at this time increases without fail. Therefore, the maximum photometric value is most influenced by disturbance. In step S902, the MPU 100 calculates the average value of the photometric values except for the determined maximum value. In step S903, the MPU 100 stores this average value as a value to be used for the calculation of a proper integral value for main light emission in the EEPROM 102 or the RAM (not shown).

Figure 10:
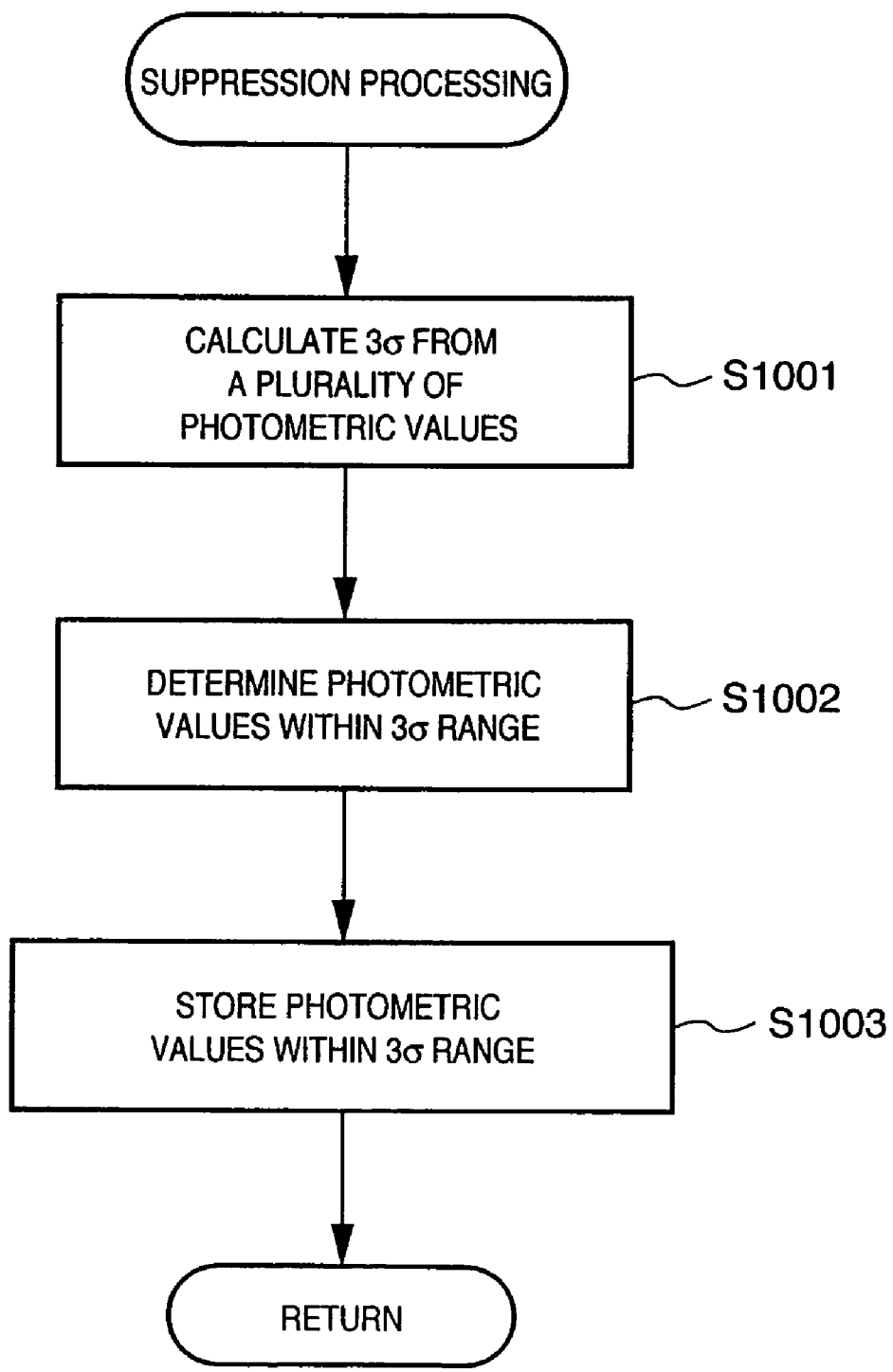
FIG. 10 is a flowchart exemplifying still another suppression processing according to the embodiment.

FIG. 10 is a flowchart exemplifying still another suppression processing according to the embodiment. This flowchart corresponds to step S505 described above. In step S1001, the MPU 100 reads out a plurality of photometric values from the EEPROM 102 or the RAM (not shown), and calculates 3σ of the readout values. This operation is performed to exclude an abnormal photometric value by the 3σ rule in statistical processing. In step S1002, the MPU 100 determines photometric values which fall within the 3σ range. In step S1003, the MPU 100 stores the photometric values within the 3σ range as values to be used for the calculation of a proper integral value for main light emission in the EEPROM 102 or the RAM (not shown).

In the above embodiment, reflect light from an object upon preliminary light emission is photometered a plurality of number of times. However, if photometry is performed a plurality of number of times within a general photometry time (tpre), the photometry time per photometry becomes short. In some cases, therefore, sufficient photometry accuracy cannot be maintained. In order to solve this problem, the photometry time per photometry may be set to be sufficiently long by making the light emission time of preliminary light emission and the total photometry time become longer than the general photometry time (tpre). Note, however, that as the preliminary light emission time prolongs, new problems arise. For example, the energy in the capacitor is wasted or the release time lag prolongs in proportion to the prolongation of the preliminary light emission time. A means for solving these trade-off problems will be described below.

Figure 11:
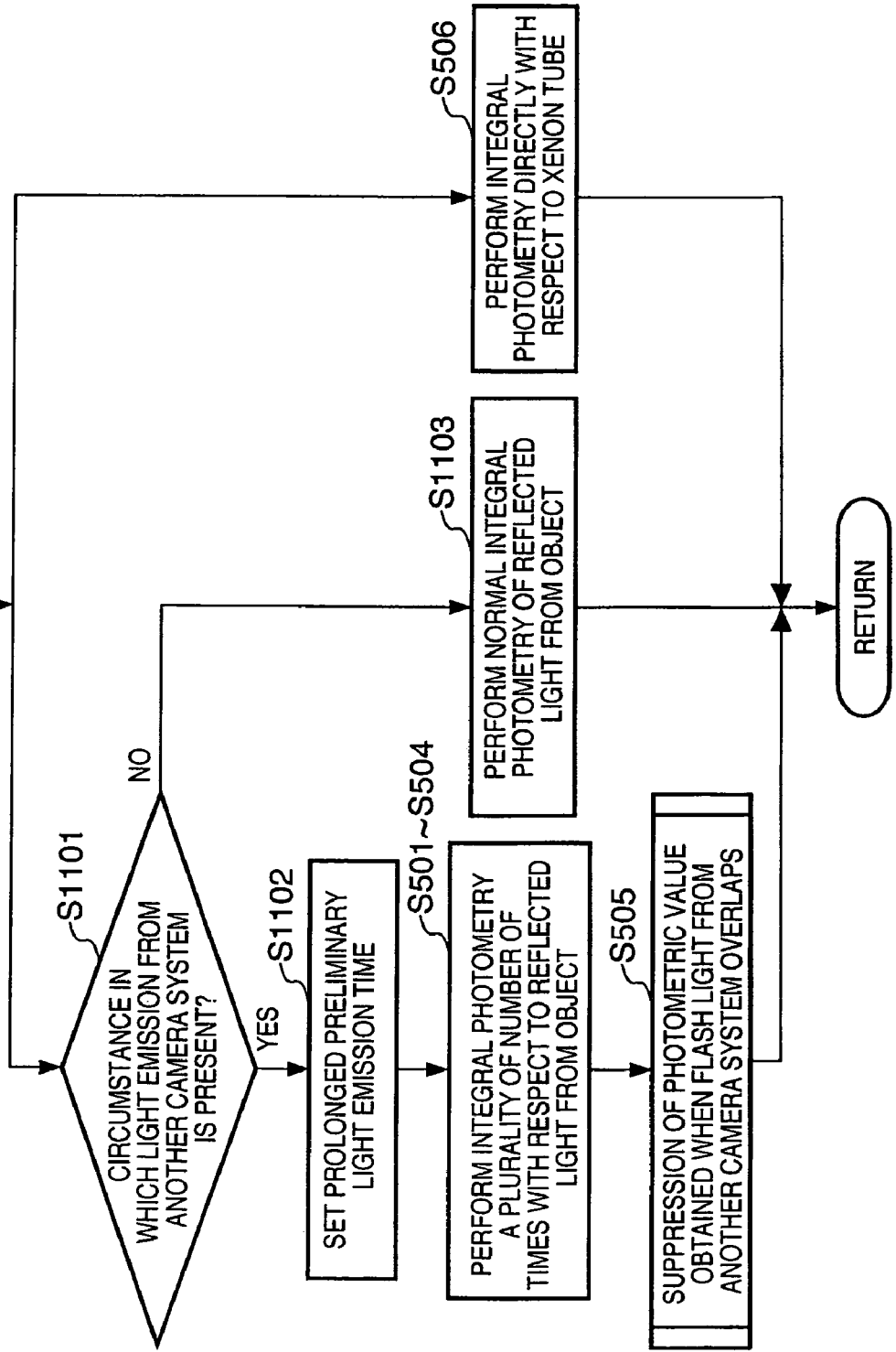
FIG. 11 is a flowchart exemplifying another preliminary light emission and photometry processing according to the embodiment.

FIG. 11 is a flowchart exemplifying another preliminary light emission and photometry processing according to the embodiment. This flowchart corresponds to the subroutine in step S410 described above. The portions which have already been described will be denoted by the same reference numerals for the sake of simple explanation.

In step S1101, the MPU 100 determines whether the ambient circumstance of the camera system is a circumstance in which the camera system is influenced by light emission from another camera system. If, for example, the photometric value (S407) of the object brightness immediately before preliminary light emission has been influenced by flash light, it can be determined that the ambient circumstance is a circumstance in which light emission is performed many times, e.g., a press conference hall or a wedding reception hall.

Figure 12A:
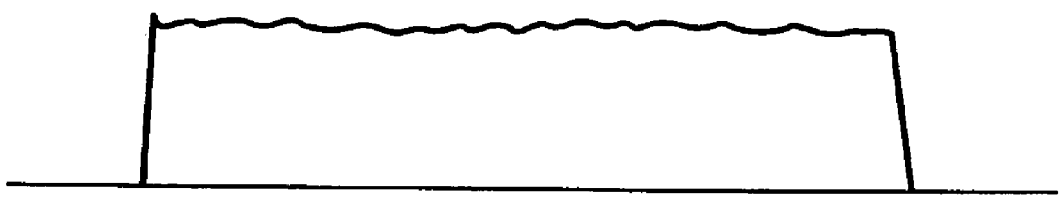
FIGS. 12A and 12B are graphs each showing an example of how the photometric value of object brightness changes.
Figure 12B:

FIGS. 12A and 12B are graphs each showing an example of change in photometric value with respect to the object brightness. More specifically, FIG. 12A shows a case wherein the camera system is not influenced by flash light. FIG. 12B shows a case wherein the camera system is influenced by flash light. As is obvious from FIGS. 12A and 12B, when flash light is emitted from another camera system, a large variation occurs in part of a photometric value. If, therefore, there is a large variation in part of the photometric value of object brightness, it is determined that the camera system is influenced by flash light, and the flow advances to step S1102. If the camera system is not influenced by flash light, the flow advances to step S1103.

Alternatively, a cameraman may manually make settings concerning an ambient circumstance. This is because the cameraman is familiar with the ambient circumstance. In this case, the MPU 100 detects setting instructions concerning the ambient circumstance which are input from mode setting dials and the like through the switch sense circuit 110, and determines the ambient circumstance in accordance with the detection result.

In step S1102, the MPU 100 sets a longer photometry time for preliminary light emission than the general photometry time. Thereafter the MPU 100 executes steps S501 to S505.

Figure 13:
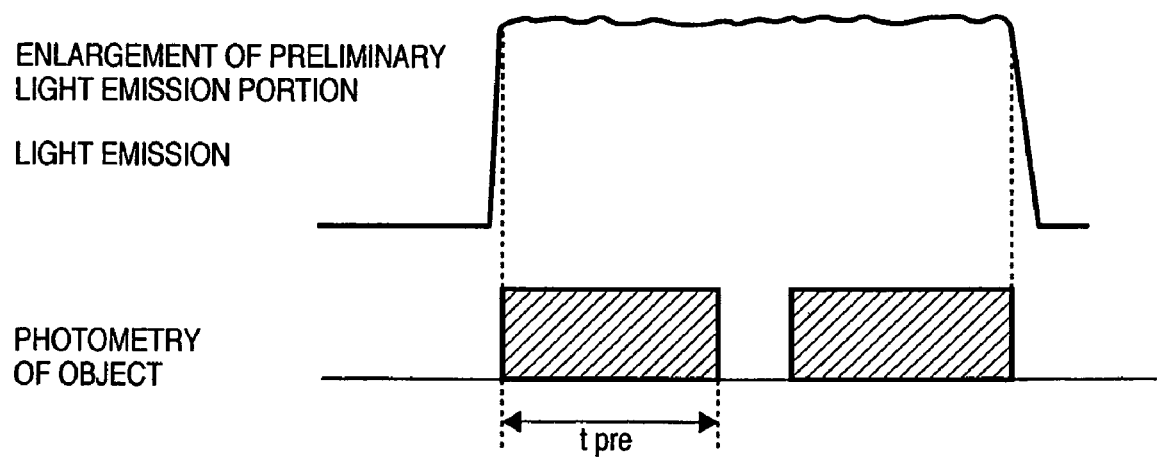
FIG. 13 is a graph showing an example of how the photometry time for preliminary light emission is prolonged according to the embodiment.

FIG. 13 is a graph showing an example of how the photometry time for preliminary light emission is prolonged according to the embodiment. In this case, the photometry time for preliminary light emission which is twice or more the general photometry time is ensured. The photometry time per photometry is set to be equal to the general photometry time tpre. How much this photometry time is prolonged depends on trade-offs with a release time lag, energy consumption, and the like. That is, as the photometry time prolongs, the measurement accuracy improves, but the release time lag or the energy consumption increases. In consideration of such trade-offs, therefore, the suitable length of the photometry time is determined for each camera system.

When the camera system is not influenced by flash light, the MPU 100 executes photometry upon setting the photometry time for preliminary light emission to the general photometry time tpre in step S1103, as shown in FIG. 6B. In either case, it is obvious that direct light upon preliminary light emission from the xenon tube 19 is directly photometered concurrently (S506).

As described above, in the embodiment associated with FIG. 11, the preliminary light emission photometry modes are switched in accordance with the ambient circumstance of the camera system. That is, if flash light is emitted from another camera system, the mode of suppressing the influence of the flash light is executed. In this mode, the photometry accuracy per photometry can be improved by prolonging the preliminary light emission time as compared with the general preliminary light emission time. If no flash light is emitted from another camera system, a more suitable photometry mode is used in consideration of the power consumption or release time lag.

As has been described above, the camera system of this embodiment photometers reflect light from the object upon preliminary light emission a plurality of number of times, and suppresses photometric values, of a plurality of obtained photometric values, which may have been influenced by light emission from another camera system. This allows the camera system to properly set an integral value as a reference for flash exposure in main light emission. This makes it possible to photograph an image with a more proper exposure than in the prior art.

In addition, suppression can be realized by, for example, selecting the minimum value of a plurality of photometric values, calculating the average value of photometric values other than the maximum value, or calculating the average value of photometric values within the 3σ range. In either case, photometric values which may have been influenced by light emission from another camera system are hardly reflected in a proper integral value for main light emission.

If the ambient circumstance of the camera system is a circumstance in which the camera system is likely to be influenced by light emission from another camera system, reflect light from the object upon preliminary light emission is preferably photometered n times (n is a natural number equal to or more than two). In a circumstance in which the probability that the camera system will be influenced by such reflect light is low, the system may use an arrangement designed to photometer the reflect light m times (m is a natural number less than n; for example, m=1). This reduces wasteful energy consumption and suppresses an increase in release time lag. This arrangement is especially effective when a photometry time in preliminary light emission which is longer than the general time (FIG. 6B) is to be ensured to ensure sufficiently high photometry accuracy per photometry in performing photometry a plurality of number of times.

In addition, the present invention can be applied to not only a situation in which the camera system is influenced by light emission from another camera system but also a situation in which light emission as disturbance different from preliminary light emission occurs in a partial period of the photometry time in preliminary light emission.

This embodiment has exemplified the camera system comprising the camera body 1 and the external electronic flash 18. Obviously, however, the present invention can be applied to a camera in which an electronic flash is built into the camera body.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-088935, filed Mar. 25, 2005, which is hereby incorporated by reference herein in its entirety.

What is claimed is:

1. A camera comprising:
   a photometry unit which photometers reflected light from an object upon preliminary light emission a plurality of times;
   a suppression unit which suppresses a photometric value, of a plurality of photometric values obtained by said photometry unit, which may have been influenced by light emission as disturbance other than the preliminary light emission; and
   a determination unit which determines an amount of light for main light emission by using the photometric values;
   wherein said suppression unit comprises a unit which calculates an average value of photometric values obtained by removing a maximum photometric value from the plurality of photometric values.

2. A camera comprising:
   a circumstance determination unit which determines whether an ambient circumstance of the camera is a circumstance in which the camera is influenced by light emission other than the preliminary light emission,
   a photometry unit which photometers reflected light from an object upon the preliminary light emission a plurality of times if it is determined that the ambient circumstance is a circumstance in which the camera is influenced by light emission as disturbance other than the preliminary light emission, and photometers reflected light from the object upon the preliminary light emission only once if it is determined that the ambient circumstance is a circumstance in which the camera is not influenced by light emission as disturbance other than the preliminary light emission;
   a suppression unit which suppresses a photometric value, of a plurality of photometric values obtained by said photometry unit, which may have been influenced by light emission as disturbance other than the preliminary light emission; and
   a determination unit which determines an amount of light for main light emission by using the photometric values.

3. The camera claimed in claim 2, wherein said circumstance determination unit determines an ambient circumstance of the camera on the basis of a photometric value of natural light photometered by said photometry unit before preliminary light emission.

4. The camera claimed in claim 3, wherein in a circumstance in which the camera is influenced by light emission as disturbance other than the preliminary light emission, a photometry time in preliminary light emission in said photometry unit is set to be long relative to a photometry time in preliminary light emission in a circumstance in which the camera is not influenced by light emission as disturbance other than the preliminary light emission.

5. A method for controlling a camera, the method comprising the steps of:
   photometering reflected light from an object upon preliminary light emission;
   suppressing a photometric value, of a plurality of photometric values obtained from reflected light from the object by the preliminary light emission, which may have been influenced by light emission as disturbance other than the preliminary light emission; and
   determining an amount of light for main light emission by using the photometric values;
   wherein the suppression step includes a step of calculating an average value of photometric values obtained by removing a maximum photometric value from the plurality of photometric values.

6. A method for controlling a camera, the method comprising the steps of:
   determining whether an ambient circumstance of the camera is a circumstance in which the camera is influenced by light emission other than the preliminary light emission;
   photometering reflected light from the object upon the preliminary light emission a plurality of times if it is determined that the ambient circumstance is a circumstance in which the camera is influenced by light emission as disturbance other than the preliminary light emission, and a step of photometering reflected light from the object upon the preliminary light emission only once if it is determined that the ambient circumstance is a circumstance in which the camera is not influenced by light emission as disturbance other than the preliminary light emission;
   suppressing a photometric value, of a plurality of photometric values obtained from reflected light from the object by the preliminary light emission, which may have been influenced by light emission as disturbance other than the preliminary light emission; and
   determining an amount of light for main light emission by using the photometric values.

7. The method claimed in claim 6, wherein the circumstance determination step includes a step of determining an ambient circumstance of the camera on the basis of a photometric value of natural light photometered before preliminary light emission.

8. The method claimed in claim 7, wherein in a circumstance in which the camera is influenced by light emission as disturbance other than the preliminary light emission, a photometry time in preliminary light emission in the photometry step is set to be long relative to a photometry time in preliminary light emission in a circumstance in which the camera is not influenced by light emission as disturbance other than the preliminary light emission.

9. The method claimed in claim 7, further comprising a step of inputting an instruction to the camera, wherein the circumstance determination step includes a step of determining an ambient circumstance of the camera in accordance with an instruction input in the input step.

10. The method claimed in claim 9, wherein in a circumstance in which the camera is influenced by light emission as disturbance other than the preliminary light emission, a photometry time in preliminary light emission in the photometry step is set to be long relative to a photometry time in preliminary light emission in a circumstance in which the camera is not influenced by light emission as disturbance other than the preliminary light emission.

* * * * *